United States Patent Office 3,655,685
Patented Apr. 11, 1972

---

3,655,685
2-(IMIDAZOLIDINYLIDENE-(2)-AMINO)-5-NITRO-THIAZOLES AND SALTS THEREOF
Wolfgang Reuter and Eberhard Kutter, Biberach (Riss), Robert Sauter, Laupheim, and Hans Machleidt and Alexander Wildfeuer, Biberach (Riss), Germany, assignors to Boehringer Ingelheim G.m.b.H., Ingelheim (Rhine), Germany
No Drawing. Filed Apr. 9, 1970, Ser. No. 27,189
Claims priority, application Germany, Apr. 9, 1969, P 19 18 070.2
Int. Cl. C07d 99/06
U.S. Cl. 260—306.8 R      8 Claims

ABSTRACT OF THE DISCLOSURE

2 - [imidazolidinylidene - (2) - amino]-5-nitro-thiazoles of the formula

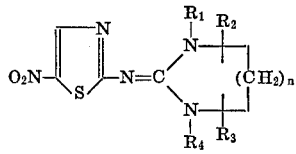

wherein $R_1$ is hydrogen or alkyl of 1 to 3 carbon atoms,
$R_2$ is hydrogen or methyl,
$R_3$ is hydrogen or methyl,
$R_4$ is alkyl of 1 to 3 carbon atoms, and
$n$ is 0 or 1, and non-toxic, pharmacologically acceptable acid addition salts thereof, useful as trichomonadicides in warm-blooded animals.

---

This invention relates to novel 2-[imidazolidinylidene-(2)-amino]-5-nitro-thiazoles and non-toxic acid addition salts thereof, as well as to various methods of preparing these compounds.

More particularly, the present invention relates to 2 - [imidazolidinylidene - (2) - amino]-5-nitro-thiazoles of the formula

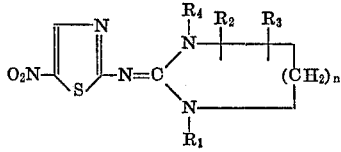

wherein $R_1$ is hydrogen or alkyl of 1 to 3 carbon atoms,
$R_2$ and $R_3$, which may be identical to or different from each other, are each hydrogen or methyl,
$R_4$ is alkyl of 1 to 3 carbon atoms, and
$n$ is 0 or 1, and their non-toxic, pharmacologically acceptable acid addition salts.

The compounds of the present invention may be prepared by various methods, among which the following have proved to be particularly advantageous:

METHOD A

By reacting a 2-methyleneamino-5-nitro-thiazole of the formula

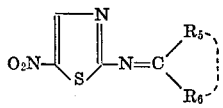

wherein $R_5$ and $R_6$, which may be identical to or different from each other, are each halogen or —S—$R_7$, where $R_7$ is alkyl, aralkyl or alkenyl, or
$R_5$ and $R_6$, together with each other, form a bismercaptoalkylene group where the alkylene moiety is of 1 to 3 carbon atoms, with a diamine of the formula

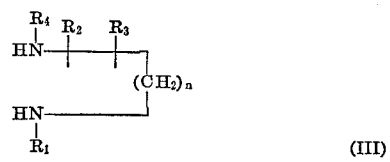

wherein $R_1$, $R_2$, $R_3$, $R_4$ and $n$ have the same meanings as in Formula I, if desired in the presence of a heavy metal oxide which forms difficultly soluble complexes with mercaptans; in the presence of lead oxide (PbO), for example.

The reaction ise carried out at elevated temperatures and advantageously in the presence of an inert organic solvent; however, it also proceeds without a solvent with the reactants in the molten state. Examples of suitable solvents are aqueous or anhydrous aliphatic alcohols or ketones. If one or both of $R_5$ and $R_6$ in compound II are halogen, the reaction is preferably carried out in the presence of an anhydrous ether, such as dioxane. The required reaction temperature depends upon the reactivity of the reactants II and III and lies preferably between 10 and 100° C.

The addition of a heavy metal oxide, such as lead oxide, is of advantage in those cases where either or both of substituents $R_5$ and $R_6$ in compound II are mercapto groups derived from mercaptans of low volatility.

METHOD B

For the preparation of a compound of the Formula I wherein $R_4$ is hydrogen, by reacting 2-amino-5-nitrothiazole with a compound of the formula

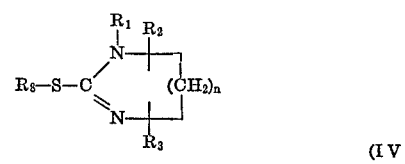

wherein $R_1$, $R_2$, $R_3$ and $n$ have the same meanings as in Formula I and $R_8$ is alkyl, aralkyl or alkenyl. The reaction is preferably performed without a solvent at room temperature, where the exothermic reaction initiates spontaneously. The reaction may, however, also be performed in an inert organic solvent at a temperature of up to 100° C.

METHOD C

For the preparation of a compound of the Formula I wherein $R_4$ is hydrogen, by nitrating a compound of the formula

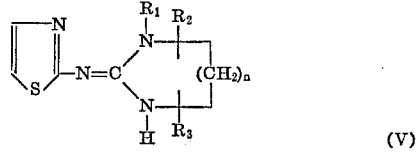

wherein $R_1$, $R_2$, $R_3$ and $n$ have the same meanings as in Formula I, at a temperature between 0° and 5° C. with a conventional nitrating agent, such as a mixture of concentrated sulfuric acid and concentrated nitric acid.

METHOD D

For the preparation of a compound of the Formula I wherein $R_1$ is hydrogen, by alkylating a compound of the formula

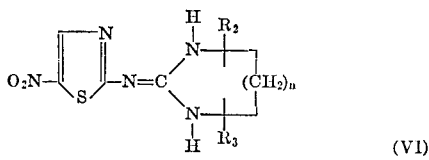

wherein $R_2$, $R_3$ and $n$ have the same meanings as in Formula I, with a conventional alkylating agent, such as an alkyl halide, especially an alkyl iodide, or a dialkyl sulfate, whose alkyl moieties are of 1 to 3 carbon atoms, at elevated temperatures, preferably between 30° and 200° C.

METHOD E

By reacting a nitrothiazole of the formula wherein A

wherein A is halogen or arylmercapto, with a compound of the formula

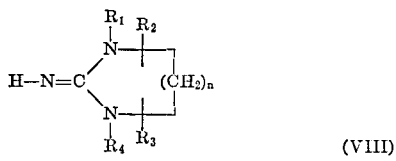

wherein $R_1$, $R_2$, $R_3$, $R_4$ and $n$ have the same meanings as in Formula I, preferably in the presence of an inert organic solvent, such as an ether or an aliphatic ketone, at a temperature between 0° and 100° C.

The compounds embraced by Formula I are organic bases and therefore form acid addition salts with inorganic or organic acids. Examples of non-toxic, pharmacologically acceptable acid addition salts include, but are not limited to, those formed with hydrochloric acid, hydrobromic acid, sulfuric acid, acetic acid, 8-chlorotheophylline or the like. Such acid addition salts are obtained according to known methods, for instance, by dissolving the free base in a suitable solvent and acidifying the solution with the desired acid.

The starting compounds for method A of the Formula II in which $R_5$ and $R_6$ are substituted mercapto groups, may be produced by reacting 2-amino-5-nitro-thiazole with carbondisulfide in the presence of a base in a polar solvent, and converting the salt of 2-(bismercapto-methylene-amino)-5-nitro-thiazole formed thereby into a compound of Formula II according to known methods, for example, by reaction with an alkyl-, aralkyl- or alkenyl-halide; if desired, this reaction may also be carried out stepwise.

Compounds of Formula II in which one of the substituents $R_5$ and $R_6$ is halogen may be prepared, for example, from a 2-[(bisalkylmercapto-methylene)-amino]-5-nitro-thiazole by reaction with a halogen in the presence of a halogenated solvent, for instance, carbontetrachloride, and while warming the reaction mixture. After the reaction is finished, the solvent is evaporated and the residue, which in most cases is an oil, is crystallized preferably with the aid of ether.

If it is desired to substitute in the thus obtained compound of the Formula II also the second substituent $R_5$ or $R_6$ by halogen, a stronger halogenating agent must be used, for example, a phosphorus pentahalide, at elevated temperatures.

According to these methods, for example, the following starting compounds of the Formula II were prepared:

2-[(chloro-methylmercapto-methylene)-amino]-5-nitro-thiazole, yellow crystals, M.P. 87°–90° C.; and 2-[dichloro-methylene)-amino]-5-nitro-thiazole, B.P.$_{0.4 \text{ mm. Hg}}$ 65°–80° C.; M.P. 95°–100° C.

The compounds of the Formula III are known from the literature or may be prepared according to methods described in the literature.

The starting compounds for Method B of the Formula IV are described in the literature [A. F. McaKy et al., J. Org. Chem. 22, 1581–1583 (1957)] or may be prepared according to known methods described in the literature.

The starting compounds for Method C of the Formula V may be prepared analogous to Method B by reacting a compound of the Formula IV with 2-amino-thiazole at a temperature between 100° and 200° C.

The starting compounds for Method C of the Formula VI may be prepared according to Method A by reacting a compound of the Formula II with a compound of the Formula III wherein $R_1$ and $R_4$ are both hydrogen.

The starting compounds of the Formula VII for method D are described in the literature or may be prepared analogous to methods described in the literature [see Japanese Pat. 22,885/63, abstracted in C.A. 60, 4154 d–e; and K. Ganapathi et al., Proc. Indian Acad. Sci 22 A, 343–358 (1954), abstracted in C.A. 40, 4059$^9$].

The starting compounds of the Formula VIII for method E are also described in the literature or may be prepared analogous to methods described in the literature (see A. F. McKay et al., supra).

The following examples further illustrate the present invention and will enable others skilled in the art to understand it more completely. It should be understood, however, that the invention is not limited solely to the particular examples given below.

EXAMPLE 1

2-[(1-methyl-2-imidazolidinylidene)-amino]-5-nitro-thiazole by method A 10 gm. (0.04 mol) of 2-[(bismethylmercapto-methylene)amino]-5-nitro-thiazole were suspended in 300 ml. of ethanol, 3 gm. (0.04 mol) of N-methyl-ethylenediamine were added, and the mixture was refluxed for ten minutes. Everything went into solution, accompanied by evolution of methylmercaptan. Thereafter, the reaction solution was allowed to stand at room temperature for five hours and was then cooled. Subsequently, the crystalline substance which had precipitated during that time was collected by vacuum filtration, and the filter cake was washed with a little ethanol and then dried at 40° C. 9 gm. (99% of theory) of 2-[(1 - methyl - 2-imidazolidinylidene)-amino]-5-nitro-thiazole, M.P. 204–206° C. (decomp.) of the formula

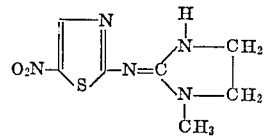

were obtained. The same result was obtained when the reaction solution was stirred at room temperature for ten hours and then worked up as described.

EXAMPLE 2

2-[(1-methyl-2-imidazolidinylidene)-amino]-5-nitro-thiazole by method A 9.9 gm. (0.04 mol) of 2-[(1,3-dithia-cyclopentylidene-(2))-amino]-5-nitro-thiazole and 13.5 gm. of lead oxide (PbO) were suspended in 500 ml. of ethanol, 3 gm. (0.04 mol) of N-methyl-ethylenediamine were added to the suspension, and the mixture was refluxed for three hours while stirring. Thereafter, the insoluble lead complex was separated by vacuum filtration, the filtrate was concentrated to one-half its volume by evaporation, and the precipitated reactor product was worked up as described in Example 1. 6.3 gm. (61.5% of theory) of 2-[(1-methyl-2-imidazolidinylidene)-amino] - 5-nitro-thiazole, M.P. 204–206° C. (decomp.) were obtained.

EXAMPLE 3

2-[(1-methyl-2-imidazolidinylidene)-amino]-5-nitro-thiazole by method A 2.05 gm. (0.01 mol) of 2 - [(chloro-methylmercapto-methylene)-amino]-5-nitro-thiazole were dissolved in 50 ml. of absolute dioxane and, while stirring the solution, 1.5 gm. (0.02 mol) of N-methyl-ethylenediamine were added dropwise at 20° C., whereby the temperature of the solution rose to about 40° C. Thereafter, the reaction mixture was stirred at 20° C. for two hours more and was then allowed to stand for a few hours. Subsequently, the crystalline substance which had precipitated was collected by vacuum filtration and recrystallized once from ethyl acetate. 0.4 gm. (17.6% of theory) of 2-[(1-methyl-2 - imidazolidinylidene)-amino] - 5-nitro-thiazole, M.P. 204–206° C. (decomp.), were obtained.

EXAMPLE 4

2-[(1-methyl-2-imidazolidinylidene)-amino]-5-nitro-thiazole by method A 10 gm. (0.04 mol) of 2-[(bismethylmercapto-methylene)-amino] - 5-nitro-thiazole were suspended in carbon tetrachloride and, while stirring the suspension at 20° C., dry chlorine was introduced into it, whereby a solution was formed. The solution was then refluxed for about 30 minutes while continuing to introduce chloride. Thereafter, the reaction solution was evaporated to dryness, and the residue was admixed with 50 ml. of absolute ether. The 2-[(chloromethylmercapto-methylene)-amino] - 5-nitro-thiazole formed as a side product precipitated out as a deliquescent substance and was vacuum-filtered off. The filtrate was an ethereal solution of 2-[(dichloromethylene)-5-nitro-thiazole; while stirring the same on an ice bath, a solution of 9 gm. (0.12 mol) of N-methyl-ethylenediamine in ether was added dropwise thereto. A brownish-yellow, greasy substance precipitated out, which was vacuum-filtered off. The filter cake was stirred with water, concentrated ammonia was added to the aqueous mixture until it reacted alkaline, the alkaline mixture was vacuum-filtered, and the filter cake was washed with water, dried at 40° C. and recrystallized from ethyl acetate. 0.75 gm. (12% of theory) of 2-[(1-methyl-2-imidazolidinylidene)-amino]-5-nitro-thiazole, M.P. 204–206° C. (decomp.), was obtained.

EXAMPLE 5

2-[(1-methyl-2-imidazolidinylidene)-amino]-5-nitro-thiazole by method B 4.2 gm. (0.04 mol) of 1-methyl-2-methylmercapto-$\Delta^2$-imidazoline were admixed with 1.45 gm. (0.01 mol) of 2-amino-5-nitro-thiazole, whereupon an exothermic reaction accompanied by release of methylmercaptan ensued. The mixture was stirred for 90 minutes at room temperature. Thereafter, the excess of unreacted 1-methyl-2-methylmercapto-$\Delta^2$-imidazoline was distilled off in vacuo, and the residue was recrystallized from ethanol. 1.4 gm. (61.8% of theory) of 2 - [(1-methyl-2-imidazolidinylidene)-amino] - 5-nitro-thiazole, M.P. 204–206° C., were obtained.

EXAMPLE 6

2-[(1-methyl-2-imidazolidinylidene)-amino]-5-nitro-thiazole by method D 2.13 gm. (0.01 mol) of 2 - (2 - imidazolidinylidene-amino) - 5 - nitro-thiazole and 1.38 gm. (0.01 mole) of potassium carbonate were together suspended in 80 ml. of dry acetone, and the suspension was refluxed for 8 hours. Thereafter, the insoluble matter was separated by vacuum filtration, and the filtrate was chromatographed on silica gel, yielding 2-[(1-methyl-2-imidazolidinylidene)-amino]-5-nitro-thiazole, M.P. 204–206° C.

EXAMPLE 7

2-[(1-methyl-2-imidazolidinylidene)-amino]-5-nitro-thiazole by method C 1.82 gm. (0.01 mol) of 2 - [(1 - methyl - 2 - imidazolidinylidene)-amino]-thiazole were introduced into 20 ml. of concentrated sulfuric acid, and the mixture was stirred and gently heated until everything had gone into solution. The resulting solution was then placed on an ice-salt bath, and, while stirring, 1.03 gm. (0.011 mol) of aqueous 67% nitric acid were added all at once to the solution. The mixture was then stirred on the ice-salt bath for one hour more, and was thereafter allowed to stand at room temperature overnight. Subsequently, the reaction mixture was poured over about 30 gm. of ice, and the aqueous mixture was neutralized with ammonia. The precipitate formed thereby was collected by vacuum filtration, washed with water, dried at 40° C., and recrystallized from ethyl acetate. 1.9 gm. (83.6% of theory of 2 - [(1 - methyl-2-imidazolidinylidene)amino]-5-nitro-thiazole, M.P. 204–206° C., were obtained.

EXAMPLE 8

Using a procedure analogous to that described in Example 1, 2-[(1-ethyl - 2 - imidazolidinylidene)-amino]-5-nitro-thiazole, M.P. 174–175° C. (decomp.), of the formula

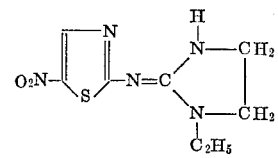

was prepared from 2 - [(bismethylmercapto-methylene)-amino]-5-nitro-thiazole and N-ethyl-ethylenediamine. The yield was 65% of theory.

EXAMPLE 9

Using a procedure analogous to that described in Example 1, 2-[(1,4-dimethyl-2-imidazolidinylidene)-amino]-5-nitro-thiazole, M.P. 200° C. (decomp.), of the formula

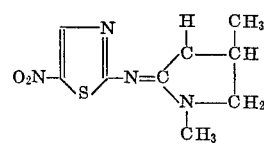

was prepared from 2 - [(bismethylmercapto-methylene)-amino] - 5 - nitro-thiazole and 2-methylamino-isopropylamine. The yield was 57% of theory.

EXAMPLE 10

Using a procedure analogous to that described in Example 1, 2-[(1,3-dimethyl-2-imidazolidinylidene)-amino]-5-nitro-thiazole, M.P. 114–116° C., of the formula

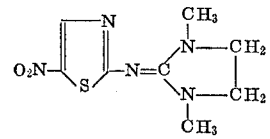

was prepared from 2 - [(bismethylmercapto-methylene)-amino] - 5 - nitro-thiazole and N,N'-dimethyl-ethylenediamine. The yield was 57% of theory.

EXAMPLE 11

Using a procedure analogous to that described in Example 1, 2-[(1-n-propyl-2-imidazolidinylidene)-amino]-5-nitro-thiazole, M.P. 149–150° C., of the formula

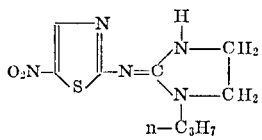

was prepared from 2 - [(bismethylmercapto-methylene)-amino]-5-nitro-thiazole and N-n-propyl-ethylenediamine. The yield was 67% of theory.

EXAMPLE 12

2-[(1,3,4-trimethyl-2-imidazolidinylidene)-amino]-5-nitro-thiazole by method A

A solution of 3.1 gm. (0.03 mol) of 1,2-di-(methyl-amino)-propane in 30 ml. of propanol was added dropwise over a period of 10 minutes to a refluxing mixture consisting of 7.5 gm. (0.03 mol) of 2-[bis-(methylmercapto)-methylene-amino]-5-nitro-thiazole and 130 ml. of n-propanol, whereby everything went into solution. The solution was refluxed for 30 minutes more, allowed to cool, and the crystalline precipitate was collected by vacuum filtration and recrystallized from n-propanol. 4.5 gm. (59% of theory) of 2-[(1,3,4-trimethyl-2-imidazolidinylidene)-amino]-5-nitro-thiazole, M.P. 124–126° C., of the formula

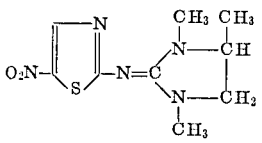

were obtained.

EXAMPLE 13

Using a procedure analogous to that described in Example 1, 2 - [(1-methyl-hexahydro-2-pyrimidinylidene)-amino]-5-nitro-thiazole, M.P. 194° C., for the formula

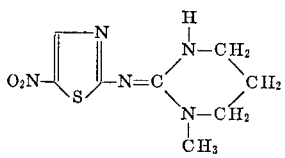

was prepared from 2-[bis-(methyl-mercapto)-methylene-amino]-5-nitro-thiazole and 3-methylamino - n - propyl-amine. The yield was 80% of theory.

EXAMPLE 14

Using a procedure analogous to that described in Example 5, 2-[(1-ethyl-2-imidazolidinylidene)amino] - 5 - nitro-thiazole, M.P. 174–175° C. (decomp.), was prepared from 1-ethyl-2-methylmercapto-Δ²-imidazoline and 2-amino-5-nitro-thiazole. The yield was 50% of theory.

EXAMPLE 15

Using a procedure analogous to that described in Example 6, 2 - [(1 - ethyl - 2 - imidazolidinylidene)-amino]-5-nitro-thiazole, M.P. 174–175° C. (decomp.), was prepared from 2-[imidazolidinylidene1(2)-amino] - 5 - nitro-thiazole and ethyl iodide. The reaction mixture was worked up by thick-layer chromatography on silica gel.

EXAMPLE 16

Using a procedure analogous to that described in Example 7, 2-[(1 - ethyl - 2 - imidazolidinylidene) - amino]-5-nitro-thiazole, M.P. 174–175° C. (decomp.), was prepared from 2 - [(1 - methyl - 2 - imidazolidinylidene)-amino]-thiazole. The yield was 70% of theory.

EXAMPLE 17

Using a procedure analogous to that described in Example 5, 2 - [(1,4 - dimethyl - 2 - imidazolidinylidene)-amino] - 5 - nitro - thiazole, M.P. 200° C. (decomp.), was prepared from 1,4-dimethyl-2-methylmercapto-Δ²-imidazoline and 2-amino-5-nitro-thiazole. The yield was 50% of theory.

EXAMPLE 18

Using a procedure analogous to that described in Example 6, 2 - [(1,4 - dimethyl - 2 - imidazolidinylidene)-amino]-5-nitro-thiazole, M.P. 200° C. (decomp.), was prepared from 2 - [(4 - methyl - 2 - imidazolidinylidene)-amino]-5-nitro-thiazole.

EXAMPLE 19

Using a procedure analogous to that described in Example 1,2 - [(1,4 - dimethyl - 2 - imidazolidinylidene)-amino]-5-nitro-thiazole, M.P. 200° C. (decomp.), was prepared from 2 - [(1,4-dimethyl-2-imidazolidinylident)-amino]-thiazole.

EXAMPLE 20

2[(1-methyl-2-imidazolidinylidene)-amino]-5-nitro-thiazole by method E

A solution of 1.65 gm. (0.01 mol) of 2-chloro-5-nitro-thiazole in 40 ml. of acetone was added to a solution of 2 gm. (0.02 mol) of 1-methyl-2-imino-imidazolidine in 40 ml. of acetone, while stirring, whereby the temperature of the mixed solution rose to about 30° C. After about two minutes a brown precipitate separated out. The reaction mixture was allowed to stand at room temperature for five hours and was then filtered. The filtrate was concentrated by evaporation and then separated into its components by thick-layer chromatography on silica gel with ethyl acetate as the flow agent. Much of the material deposited at the start. A short distance above the start, a noticeable red zone was formed on the plate. Above this red zone, there was a strong yellow zone and then two indistinct, blurred zones, and above them another intense yellow zone. This last yellow zone was scraped off and eluted with methanol, yielding 2-[(1-methyl-2-imidazolidinylidene)-amino]-5-nitro-thiazole, M.P. 204–206° C. (decomp.).

EXAMPLE 21

2-[(1-methyl-2-imidazolidinylidene)-amino]-5-nitro-thiazole by method E 1.29 gm. (0.005 mol) of 5 - nitro - 2 - phenylmercapto-thiazole were dissolved at room temperature in 35 ml. of dioxane, and the solution was admixed with a solution of 0.45 gm. (0.005 mol) of 1-methyl-2-imino-imidazolidine in 15 ml. of dioxane. After standing some time at room temperature, the reaction mixture turned dark; after standing some more at room temperature, a dark greasy precipitate settled out. The supernatant liquid was decanted from the precipitate, concentrated by evaporation, and resolved into its components by thick-layer chromatography on silica gel. Above a deposit at the starting point there were three additional yellow main deposit zones, of which the middle one was scraped off and eluted with methanol, yielding 2 - [(1 - methyl - 2 - imidazolidinylidene)-amino]-5-nitro-thiazole, M.P. 204–206° C. (decomp.).

EXAMPLE 22

2-[(1-methyl-2-imidazolidinylidene)-amino]-5-nitro-thiazole hydrochloride 1.2 gm. of (0.0053 mol) of 2-[(1-methyl-2-imidazolidinylidene)-amino]-5-nitro-thiazole were dissolved in 60 ml. of methylene chloride and, while stirring and cooling the solution on an ice bath, dry gaseous hydrogen chloride was introduced into it. After a short time colorless crystals separated out which, however, soon went into solution again. The slightly yellow solution was concentrated by evaporation in vacuo at 20° C., and the crystalline precipitate formed thereby was collected by vacuum filtration and washed with warm methylene chloride. 0.7 gm. (50% of theory) of 2-[(1 - methyl - 2 - imidazolidinylidene)-amino] - 5 - nitro - thiazole hydrochloride were obtained, which had a melting point of 212° C. (decomp.) and at about 220° C. formed a brown fused mass.

EXAMPLE 23

Using a procedure analogous to that described in Example 20, 2-[(1 - ethyl - 2 - imidazolidinylidene)-amino]-5-nitro-thiazole, M.P. 173–175° C. (decomp.), was prepared from 1-ethyl-2-imino-imidazolidine and 2-chloro-5-nitro-thiazole.

EXAMPLE 24

Using a procedure analogous to that described in Example 21, 2-[(1-ethyl-2-imidazolidinylidene)-amino]-5-nitro-thiazole, M.P. 173–175° C. (decomp.) was prepared from 1-ethyl-2-imino-imidazolidine and 5-nitro-2-phenyl-mercapto thiazole.

EXAMPLE 25

Using a procedure analogous to that described in Example 20, 2 - [(1,4 - dimethyl-2-imidazolidinylidene)-amino]-5-nitro-thiazole, M.P. 199° C. (decomp.), was prepared from 1,4-dimethyl-2-imino-imidazolidine and 2-chloro-5-nitro-thiazole.

EXAMPLE 26

Using a procedure analogous to that described in Example 21, 2 - [(1,4 - dimethyl-2-imidazolidinylidene)-amino]-5-nitro-thiazole. M.P. 199° C. (decomp.), was prepared from 1,4-dimethyl-2-imino-imdazoldne and 5-nitro-2-phenylmercapto-thiazole.

EXAMPLE 27

Using a procedure analogous to that described in Example 1, 2 - [(1,5 - dimethyl-2-imidazolidinylidene)-amino]-5-nitro-thiazole, M.P. 201–202° C. (decomp.), of the formula

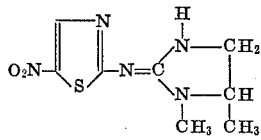

was prepared from 2-[bis-(methyl-mercapto)-methylene-amino] - 5 - nitro-thiazole and 2-methylamine-n-propylamine. The yield was 50% of theory.

EXAMPLE 28

Using a procedure analogous to that described in Example 5, 2 - [(1,5 - dimethyl-2-imidazolidinylidene)-amino]-5-nitro-thiazole, M.P. 201–202° C. (decomp.), was prepared from 1.5-dimethyl-2-methylmercapto-$\Delta^2$-imidazoline and 2-amino-5-nitro-thiazole. The yield was 40% of theory.

EXAMPLE 29

Using a procedure analogous to that described in Example 7, 2 - [(1,5-dimethyl - 2 - imidazolidinylidene)-amino]-5-nitro-thiazole, M.P. 201–202° C. (decomp.), was prepared from 2-[1,5 - dimethyl-2-imidazolidinylidene)-amino]-thiazole. The yield was 70% of theory.

EXAMPLE 30

Using a procedure analogous to that described in Example 20, 2 - [1,5 - dimethyl-2-imidazolidinylidene)-amino]-5-nitro-thiazole, M.P. 201° C. (decomp.), was prepared from 1,5-dimethyl-2-imino-imidazolidine and 2-chloro-5-nitro-thiazole.

EXAMPLE 31

Using a procedure analogous to that described in Example 21, 2 - [(1,5-dimethyl-2-imidazolidinylidene)- amino]-5-nitro-thiazole, M.P. 201° C. (decomp.), was prepared from 1,5-dimethyl-2-imino-imidazolidine and 5-nitro-2-phenylmercapto-thiazole.

The compounds according to the present invention, that is, those embraced by Formula I above and their non-toxic, pharmacologically acceptable acid addition salts, have useful pharmacodynamic properties. More particularly, the compounds of the present invention exhibit antibacterial activities, and are especially active against trichomonas in warm-blooded animals, such as mice.

The compounds of the invention were found to be antibacterially active, especially against trichomonas, by a standard test on male laboratory mice of the NMRI-strain which had been infected with trichomonas foetus. A broth containing thioglycolate and 10% of horseserum and a mixture of antibiotics (500 International Units of penicillin/ml. and 0.2 mg. of streptomycin/ml. at a pH-value of 7.0 served as nutrient medium for the culture of trichomonas foetus. The time of incubation of trichomonas foetus in this nutrient medium was 24 hours at a temperature of 37° C.

From this mixture, which was diluted so that, under a microscope with 320-fold magnification, about 8 to 10 trichomonas foetus could be seen, 0.5 ml. were administered intraperitoneally to each of 6 mice per compound being tested. The infected animals were perorally treated over a period of 3 days, two times per day, with a dose 50 mg./kg. to 100 mg./kg. of the compound under investigation, the treatment starting 2 hours post infectionem. After 28 days had passed, the number of surviving animals was determined. Untreated control animals died after 4 to 5 days.

The acute toxicity of the compounds was determined on groups of 10 male NMRI-laboratory mice per dose per compound. The mice had an average body weight of 18 to 20 gm. The peroral median lethal dose ($LD_{50}$), i.e. the peroral dose which causes 50% of the animals to die within 7 days, was calculated from the raw data according to the statistical method of Litchfield and Wilcoxon.

The results of these tests are shown in the following table.

TABLE

| Compound | Dossage, mgm./kg. | Number of surviving animals [1] | $LD_{50}$, mgm./kg. mouse, p.o. |
|---|---|---|---|
| 2-[(1-methyl-2-imidazolidinylidene)-amino]-5-nitro-thiazole | 50 | 6 | 7,500 |
| 2-[(1)3-dimethyl-2-imidazolidinylidene)-amino]-5-nitro-thiazole | 75 | 6 | 1,000 |
| 2-[(1,3,4-trimethyl-2-imidazolidinylidene)-amino]-5-nitro-thiazole | 100 | 6 | |
| 2-[(1-ethyl-2-imidazolidinylidene)-amino]-5-nitro-thiazole | 50 | 6 | ~4,000 |
| 2-[(1-n-propyl-2-imidazolidinylidene-(2))-amino]-5-nitro-thiazole | 100 | 6 | >4,000 |
| 2-[(1,4-dimethyl-2-imidazolidinylidene)-amino]-5-nitro-thiazole | 50 | 6 | >4,000 |
| 2-[(1,5-dimethyl-2-imidazolidinylidene)-amino]-5-nitro-thiazole | 50 | 5 | ~4,000 |

[1] 28 days post infectionem.

For pharmaceutical purposes the compounds according to the present invention are administered to warm-blooded animals perorally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.33 to 6.67 mgm./kg. body weight, preferably 0.83 to 4.2 mgm./kg. body weight.

The following example illustrate a few dosage unit compositions comprising a compound of the instant invention as an active ingredient and represent the best mode contemplated of putting the invention to practical use. The parts are parts by weight unless otherwise specified.

EXAMPLE 32

Tablets

The tablet composition was compounded from the following ingredients:

| | Parts |
|---|---|
| 2 - [(1-methyl-2-imidazolidinylidene)-amino]-5-nitro-thiazole | 100.0 |
| Lactose | 50.0 |
| Potato starch | 42.0 |
| Polyvinylpyrrolidone | 6.0 |
| Cellulose, microcrystalline | 20.0 |
| Magnesium stearate | 2.0 |
| Total | 220.0 |

Compounding procedure

The thiazole compound was thoroughly admixed with the lactose and the potato starch, the mixture was moistened with an ethanolic 12.5% solution of the polyvinylpyrrolidone, the moist mass was granulated by passing it through a 1.5 mm.-mesh screen, and the granulate was dried at 40° C. and again passed through a 1.0 mgm.-mesh screen. The dry granulate was admixed with the cellulose and the magnesium stearate, and the mixture was pressed into 220 mgm.-tablets. Each tablet contained 100 mgm. of the thiazole compound and, when administered perorally to a warm-blooded animal of about 60 kg. body weight in need of such treatment, produced very good trichomonoacidal effects.

EXAMPLE 33

Coated pills

The tablets obtained in Example 32 were coated pursuant to customary methods with a thin shell consisting essentially of a mixture of talcum and sugar, and the coated tablets were polished with beeswax. Each coated pill contained the same amount of active ingredients as each tablet in the preceding example and produced the same therapeutic effect.

EXAMPLE 34

Wafer capsules

The capsule filler composition was compounded from the following ingredients:

| | Parts |
|---|---|
| 2 - [(1-methyl-2-imidazolidinylidene)-amino]-5-nitro-thiazole | 200.0 |
| Corn starch | 50.0 |
| Total | 250.0 |

Compounding procedure

The thiazole compound was intimately admixed with the corn starch, and 250 mgm.-portions of the mixture were filled into wafer capsules of appropriate size. Each capsule contained 200 mgm. of the thiazole compound and, when administered perorally to a warm-blooded animal of about 60 kg. body weight in need of such treatment, produced very good trichomonoacidal effects.

EXAMPLE 35

Coated pills

The pill core composition was compounded from the following ingredients:

| | Parts |
|---|---|
| 2 - [(1-methyl-2-imidazolidinylidene)-amino]-5-nitro-thiazole | 150.0 |
| Corn starch | 60.0 |
| Gelatin | 4.0 |
| Carboxymethylcellulose, high viscosity | 4.0 |
| Magnesium stearate | 2.0 |
| Total | 220.0 |

Compounding procedure

The thiazole compound was thoroughly admixed with the corn starch, the mixture was moistened with an aqueous 10% solution of the gelatin, and the moist mass was forced through a 1.5 mm.-mesh screen, dried at 40° C. and again passed through a 1.0 mm.-mesh screen. The dry granulate thus obtained was admixed with the carboxymethylcellulose and the magnesium stearate, and the mixture was pressed into 220 mgm.-pill cores, which were then coated with a thin shell consisting essentially of a mixture of talcum and sugar, and the coated pills were polished with beeswax. Each coated pill contained 150 mgm. of the thiazole compound and, when administered perorally to a warm-blooded animal of about 60 kg. body weight in need of such treatment, produced very good trichomonoacidal effects.

EXAMPLE 36

Gelatin capsules

The capsule filler composition was compounded from the following ingredients:

| | Parts |
|---|---|
| 2 - [(1-methyl-2-imidazolidinylidene)-amino]-5-nitro-thiazole | 100.0 |
| Colloidal silicic acid | 1.0 |
| Total | 101.0 |

Compounding procedure

The thiazole compound was intimately admixed with the colloidal silicic acid, and 101 mgm.-portions of the mixture were filled into gelatin capsules of appropriate size. Each capsule contained 100 mgm. of the thiazole compound and, when administered perorally to a warm-blooded animal of about 60 kg. body weight in need of such treatment, produced very good trichomonoacidal effects.

EXAMPLE 37

Tablets

The tablet composition was compounded from the following ingredients:

| | Parts |
|---|---|
| 2 - [(1 - methyl-2-imidazolidinylidene-amino] - 5-nitro - thiazole | 200.0 |
| Lactose | 110.0 |
| Potato starch | 70.0 |
| Polyvinylpyrrolidone | 10.0 |
| Colloidal silicic acid | 5.0 |
| Magnesium stearate | 5.0 |
| Total | 400.0 |

Compounding procedure

The thiazole compound was intimately admixed with the lactose and the potato starch, the mixture was moistened with an ethanolic 10% solution of the polyvinylpyrrolidone, the moist mass was forced through a 1.5 mm.-mesh screen, and the resulting granulate was dried at 45° C. and again passed through the above screen. The dry granulate was admixed with the colloidal silicic acid and the magnesium stearate, and the mixture was pressed into 400 mgm.-tablets. Each tablet contained 200 mgm. of the thiazole compound and, when administered perorally to a warm-blooded animal of about 60 kg. body weight in need of such treatment, produced very good trichomonacidal effects.

EXAMPLE 38

Vaginal tablets

The tablet composition was compounded from the following ingredients:

| | Parts |
|---|---|
| 2-[(1 - methyl - 2 - imidazolidinylidene)-amino] 5-nitro-thiazole, milled | 100.0 |
| D-glucose | 240.0 |
| Lactose | 505.0 |
| Corn starch | 200.0 |
| Polyethyleneglycol 6000 | 33.0 |
| Polyethylene sorbiton monostearate (Tween 61) | 10.0 |
| Colloidal silicic acid | 5.0 |
| Magnesium stearate | 7.0 |
| Total | 1,1000 |

Compounding procedure

The thiazole compound was intimately admixed with the D-glucose, the lactose and the corn starch, the mixture was uniformly moistened with an aqueous 15% solution of the polyethyleneglycol which also contained the Tween 61, the moist mass was forced through 1.5 mm.-mesh screen, and the resulting granulate was dried at 45° C. and again passed through a 1.0 mm.-mesh screen. The dry granulate was admixed with the remaining ingredients, and the composition was compressed into 1100 mgm.-tablets, which were then coated with a thin layer of polyethyleneglycol 1500. Each tablet contained 100 mgm. of the thiazole compound and, when inserted into the vagina of a female warm-blooded animal of about 60 kg. body weight in need of such treatment, produced very good antimicrobial, especially trichomonacidal effects.

EXAMPLE 39

Ointment

The ointment composition was compounded from the following ingredients:

| | Parts |
|---|---|
| 2-[(1-methyl - 2 - imidazolidinylidene)-amino]-5-nitro - thiazole, milled | 1.0 |
| Vaseline | 20.0 |
| Cetiol V | 15.0 |
| Cetyl alcohol | 1.0 |
| Wool grease alcohol | 2.0 |
| Sorbitan monooleate (Span 80) | 4.0 |
| p-Hydroxy-benzoic acid methyl ester | 0.1 |
| Perfume | 0.2 |
| Distilled water | 56.7 |
| Total | 100.0 |

Compounding procedure

A mixture of the vaseline, the Cetiol, the cetyl alcohol, the wool grease alcohol and the Span 80 was melted and heated to 65° C., the methyl p-hydroxy-benzoate was dissolved therein, and then the distilled water, which had been heated to the same temperature, was emulsified in the warm mixture. The aqueous emulsion was allowed to cool to room temperature while slowly stirring it, and then the perfume was added. The thiazole compound was stirred into a portion of the ointment base, and the mixture was uniformly distributed in the remaining ointment base. The finished ointment produced very good antimicrobial, especially trichomonacidal effects when applied to microbe-infected areas of the body of a warm-blooded animal.

EXAMPLE 40

Vaginal gel

The gel composition was compounded from the following ingredients:

| | Parts |
|---|---|
| 2 - [(1 - methyl - 2 - imidazolidinylidene) - amino]- 5 - nitro - thiazole, milled | 1.0 |
| Carboxymethyl cellulose, high viscosity | 2.2 |
| Polyoxyethylene sorbitan monooleate (Tween 80) | 1.0 |
| Methyl p-hydroxy-benzoate | 0.1 |
| Propyl p-hydroxy-benzoate | 0.2 |
| Lactic acid | 0.2 |
| Glycerin | 10.0 |
| Distilled water | 85.4 |
| Total | 100.0 |

Compounding procedure

The distilled water was heated to 80° C., the p-hydroxy-benzoate as well as the Tween 80 and the lactic acid were dissolved therein, the solution was cooled to room temperature, the thiazole compound was suspended in the solution, and then a suspension of the carboxymethyl cellulose in the glycerin was stirred into the aqueous suspension. The composition was subsequently stirred until the carboxymethyl cellulose had completely dissolved. The resulting gel produced very good antimicrobial, especially trichomonacidal effects when introduced into the vagina of a female warm-blooded animal in need of such treatment.

Analogous results were obtained when any other compounds of the present invention was substituted for the particular thiazole compound in illustrative Examples 32 to 40. Likewise, the amount of active ingredient in these examples may be varied to achieve the dosage unit range set forth above, and the amounts and nature of the inert pharmaceutical carrier ingredients may be varied to meet particular requirements. In addition, a dosage unit composition according to the present invention may also comprise one or more other active ingredients having antibacterial, antiprotozoal and anthelmintic properties.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula

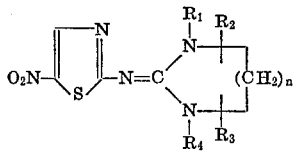

wherein
$R_1$ is hydrogen or alkyl of 1 to 3 carbon atoms,
$R_2$ and $R_3$ are each hydrogen or methyl,
$R_4$ is alkyl of 1 to 3 carbon atoms, and
$n$ is 0 or 1,
or a non-toxic, pharmacologically acceptable acid addition salt thereof.

2. A compound of the formula

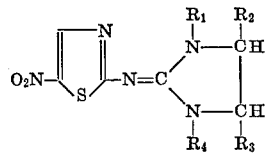

wherein
R₁ is hydrogen or alkyl of 1 to 3 carbon atoms,
R₂ and R₃ are each hydrogen or methyl and
R₄ is alkyl of 1 to 3 carbon atoms
or a non-toxic, pharmacologically acceptable acid addition salt thereof.

3. A compound according to claim 2, which is 2-[(1-methyl-2-imidazolidinylidene)-amino] - 5 - nitro-thiazole or a non-toxic acid addition salt thereof.

4. A compound according to claim 2, which is 2-[(1,4-dimethyl-2-imidazolidinylidene)-amino]-5-nitro - thiazole or a non-toxic acid addition salt thereof.

5. A compound according to claim 2, which is 2-[(1-n-propyl-2-imidiazolidinylidene)-amino]-5-nitro - thiazole or a non-toxic acid addition salt thereof.

6. A compound according to claim 2, which is 2-[(1-ethyl-2-imidazolidinylidene)-amino] - 5 - nitro-thiazole or a non-toxic acid addition salt thereof.

7. A compound according to claim 2, which is 2-[(1,3-dimethyl-2-imidazolidinylidene)-amino]-5-nitro - thiazole or a non-toxic acid addition salt thereof.

8. A compound according to claim 2, which is 2-[(1,5-dimethyl-2-imidazolidinylidene)-amino]-5-nitro - thiazole or a non-toxic addition salt thereof.

References Cited
UNITED STATES PATENTS

| | | | |
|---|---|---|---|
| 3,519,637 | 7/1970 | Hoffer | 260—306.8 |
| 3,528,980 | 9/1970 | Islip | 260—256.5 |

ALEX MAZEL, Primary Examiner

R. J. GALLAGHER, Assistant Examiner

U.S. Cl. X.R.

260—253, 256.5 R, 309.6, 309.7, 583 P; 424—251, 253, 270

PO-1050
(5/69)

UNITED STATES PATENT OFFICE
CERTIFICATE OF CORRECTION

Patent No. 3,655,685      Dated April 11, 1972

Inventor(s) WOLFGANG REUTER, EBERHARD KUTTER, ROBERT SAUTER, HANS MACHLEIDT and ALEXANDER WILDFEUER It is certified that error appears in the above-identified patent and that said Letters Patent are hereby corrected as shown below:

Correct the title to read --2-[IMIDAZOLIDINYLIDENE-(2)-AMINO]-5-NITRO-THIAZOLES AND SALTS THEREOF--

Col. 3, line 20 - delete "wherein A".
Col. 4, line 12 - correct the spelling of "McKay"
Col. 5, line 60 - correct the spelling of "accompanied".
Col. 8, lines 16-17 - change "Example 1" to --Example 7--;
        line 19 - correct the spelling of "imidazolidinylidene".
Col. 9, line 32 - correct the spelling of "imidazolidine".
Col.10, line 48 - "2-[(1)3" should read -- 2-[(1,3 --
Col. 11, line 29 - correct the spelling of "trichomonacidal"
" 11, " 60 - " " " " "
" 12, " 17 - " " " " "
" 12, " 41 - " " " " "

Col. 13, line 4 - correct the spelling of "tablet".

Signed and sealed this 5th day of September 1972.

(SEAL)
Attest:

EDWARD M. FLETCHER, JR.      ROBERT GOTTSCHALK
Attesting Officer              Commissioner of Patents